United States Patent [19]

Webb et al.

[11] 4,147,952
[45] * Apr. 3, 1979

[54] METHOD OF SEALING ALUMINA ARC TUBE

[75] Inventors: Edward A. Webb, Reading; Francis B. Makar, Jr., Beverly; Nikolaos Barakitis, Haverhill, all of Mass.

[73] Assignee: GTE Sylvania Incorporated, Danvers, Mass.

[*] Notice: The portion of the term of this patent subsequent to May 27, 1992, has been disclaimed.

[21] Appl. No.: 611,047

[22] Filed: Sep. 8, 1975

Related U.S. Application Data

[60] Continuation-in-part of Ser. No. 531,936, Dec. 12, 1974, which is a division of Ser. No. 445,063, Feb. 25, 1974, Pat. No. 3,886,392.

[51] Int. Cl.² .................. H01J 6/36; H01J 17/16; H01J 61/30
[52] U.S. Cl. ................................. 313/220; 313/221
[58] Field of Search .................. 313/220, 221, 318; 174/50, 61

[56] References Cited

U.S. PATENT DOCUMENTS

| | | | |
|---|---|---|---|
| 2,309,973 | 2/1943 | Miller | 313/318 |
| 2,433,373 | 12/1947 | Krim | 313/318 X |
| 3,281,309 | 10/1966 | Ross | 313/221 UX |
| 3,450,924 | 6/1969 | Knochel et al. | 313/221 X |
| 3,886,392 | 5/1975 | Barakitis et al. | 313/220 |

Primary Examiner—Rudolph V. Rolinec
Assistant Examiner—Darwin R. Hostetter
Attorney, Agent, or Firm—James Theodosopoulos

[57] ABSTRACT

A niobium metal tube is sealed in the axial hole of a cylindrical alumina plug using a high temperature sealing glass and the plug is sealed in the end of an alumina arc tube.

1 Claim, 2 Drawing Figures

METHOD OF SEALING ALUMINA ARC TUBE

CROSS REFERENCE TO RELATED APPLICATIONS

This application is a continuation in part of Ser. No. 531,936, filed Dec. 12, 1974, which is a divisional application of Ser. No. 445,063, filed Feb. 25, 1974, now U.S. Pat. No. 3,886,392.

BACKGROUND OF THE INVENTION

1. Field of the Invention

This invention relates to the sealing of alumina arc tubes for arc discharge lamps and in particular to high pressure sodium (HPS) vapor lamps.

2. Description of the Prior Art

Within the past few years, high pressure sodium vapor lamps have become commercially useful, especially for outdoor lighting applications, because of their high efficiency, generally in excess of 100 lumens per watt. The sodium operating vapor pressure in such lamps is of the order of about 50 to 100 Torr.

Such lamps are called high pressure in order to distinguish them from low pressure sodium vapor lamps in which the sodium operating vaor pressure is in the order of a few microns. Low pressure sodium lamps have been in use for about 30 years but although efficient, they produce an unattractive monochromatic yellow light. The color of light from HPS lamps is considerably improved over that from low pressure sodium lamps.

HPS lamps generally comprise an alumina ceramic arc tube containing a fill including sodium, mercury and an inert gas. Disposed at the ends of the arc tubes are metal electrodes and the ends of the arc tube are sealed with ceramic to metal seals.

A common method of manufacture of the arc tube, shown in U.S. Pat. No. 3,608,437, involves the use of a cylindrical sealing element of densely sintered aluminum oxide which is sintered to the inner wall at the end of a polycrystalline alumina arc tube and which contains an aperture for a cylindrical current lead-in tube. However, such a cylindrical sealing element cannot be used with a single crystal alumina arc tube since it cannot be sintered thereto in a gastight manner.

SUMMARY OF THE INVENTION

In this invention, an alumina plug, having a larger and a smaller diameter and also having an axial hole therethrough, is sealed in the end of an alumina arc tube, either single crystal or polycrystalline, with a suitable sealing glass. A niobium tube is sealed in the axial hole also with a suitable sealing glass. Thus this invention permits the use of an alumina plug to seal the end of a monocrystalline alumina arc end instead of a metal end cap as was required previously.

DESCRIPTION OF THE PREFERRED EMBODIMENT

Figure 1:
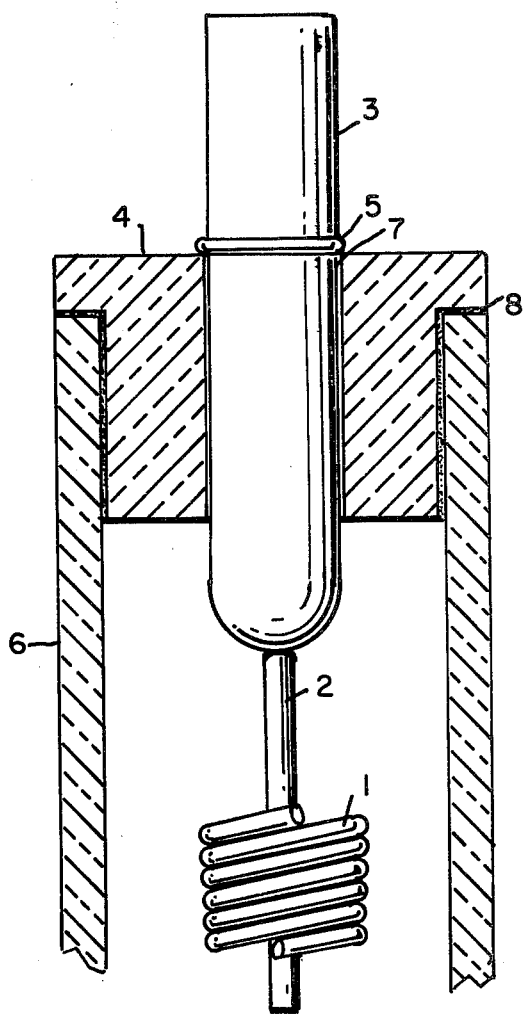
FIG. 1 is a sectional view of an alumina arc tube sealed in accordance with this invention.

As shown in FIG. 1, an electrode for an HPS arc discharge lamp comprises a tungsten coil 1 mounted on a refractory metal rod 2. Rod 2 is welded or brazed to the end of the usual niobium tube 3 which positions and supports the electrode within arc tube 6. The internal end of niobium tube 3 is vacuum tight sealed.

Niobium tube 3 extends through a hole in cylindrical alumina plug 4 and is axially algined therein by a raised peripheral seating ring 5 on niobium tube 3. For this purpose, the outer diameter of seating ring 5 is slightly larger than the diameter of the hole in alumina plug 4, for example, 150 mils versus 138 mils.

Next a sealing glass frit ring is disposed around niobium tube 3, resting on alumina plug 4. The sealing glass has a composition of the type commonly used in the sealing of alumina arc tubes for HPS lamps and consists mainly of alumina and alkaline earth oxides, primarily, calcia.

The assembly, comprising niobium tube 3, alumina plug 4 and the frit ring, is then placed in a vacuum furnace with tube 3 in vertical position, the electrode end thereof downward. The furnace is then evacuated to a submicron vacuum and sufficient heat is applied to the assembly to cause the sealing glass to melt and flow; this temperature is about 1,400° C. The glass, indicated as 7 in the drawing, flows completely around niobium tube 3 and into the capillary space between tube 3 and alumina plug 4. Said capillary space is only a few mils thick. During this melting step, vertical downward pressure may be applied to the upper end of niobium tube 3 to maintain perpendicularity and uniform seating on alumina plug 4.

It is during this melting step that any reaction between the sealing glass and the niobium tube can occur, which results in the dark reaction product that has discolored prior art arc tubes. However, the arc tube is not present during this first melting step and, therefore, is not discolored.

After removal from the furnace, the alumina plug-niobium tube assembly is then placed in the end of cylindrical alumina arc tube 6. Alumina plug 4 has a large diameter section and a small diameter section. The small diameter section is smaller than the inside diameter of arc tube 6 and this fits therein. The large diameter section rests on the end of arc tube 6. In one example, for a 150 watt arc tube 3 inches long having an O.D. and I.D. of 275 and 220 mils, respectively, plug 4 was 5 mm long overall and had a small diameter section 3½ mm long by 217 mils diameter; the large diameter section was 1½ mm long by 275 mils diameter.

Sealing is accomplished by use of another sealing glass frit ring placed bewteen the end of arc tube 6 and the large diameter section of alumina plug 4. The assembly is placed in a suitable furnace and heated, in an inert atmosphere, to melt the sealing glass. The glass is melted at a lower temperature than the previous melting step, say, about 1350° C, to avoid deposition of reaction products on arc tube 6. The sealing glass 8 flows into and fills the capillary space between plug 4 and arc tube 6. As during the first melting, vertical downward pressure may also be applied at the upper end of niobium tube 3 during the second melting step. Since the frit which melts has no contact with the niobium tube, there is no reaction product to deposit on the arc tube wall.

An advantage of this invention is that it provides a reliable seal for monocrystalline alumina arc tubes, as well as for polycrystalline arc tubes, without the need of a niobium end cap of the type shown in U.S. Pat. No. 3,243,635. In contrast, other sealing methods, such as shown in U.S. Pat. Nos. 3,564,328 and 3,609,437, that obviate niobium end caps, can only be used with polycrystalline alumina arc tubes.

Figure 2:
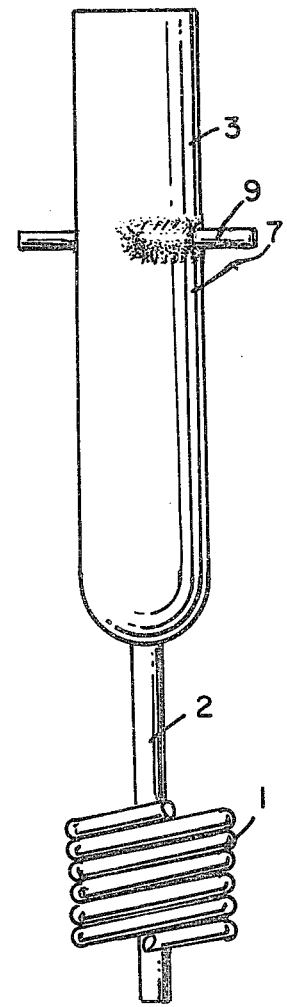
FIG. 2 is an elevational view of another niobium tube that may be used with this invention.

FIG. 2 shows another embodiment of a niobium tube that may be used with this invention. Niobium tube 3 has another means of axially aligning tube 3 within cylindrical alumina plug 4, instead of the raised peripheral seating ring 5 of FIG. 1. Tube 3 has two straight wires 9 tangentially welded thereto so that when tube 3 is inserted in the hole of plug 4, wires 9 rest against the outer surface of plug 4 and align tube 3 axially therein. In one embodiment, wires 9 were 12 mils diameter by ⅜ inch long and were welded 180° opposite each other in a plane that was perpendicular to the axis of tube 3.

We claim:

1. An arc tube for a high pressure sodium lamp comprising: an alumina arc tube having a cylindrical alumina plug sealed at each end thereof, each plug having a large and a small diameter section, the small diameter section being inserted into the arc tube and the large diameter section being outside the arc tube, the capillary space between the small diameter section and the inner wall of the arc tube being filled with a sealing glass, the capillary space between the large diameter section and the end of the arc tube being filled with a sealing glass, a niobium tube extending through said plug, said niobium tube being sealed to said plug along the entire length of said plug by a sealing glass, means on said niobium tube for axially aligning said niobium tube within said cylindrical alumina plug, said means comprising wires welded to the niobium tube, and an electrode disposed on the inner end of said niobium tube.

* * * * *